May 7, 1935.  R. H. WENTORF  2,000,309
ONE-CUP COFFEE MAKER
Filed March 1, 1933
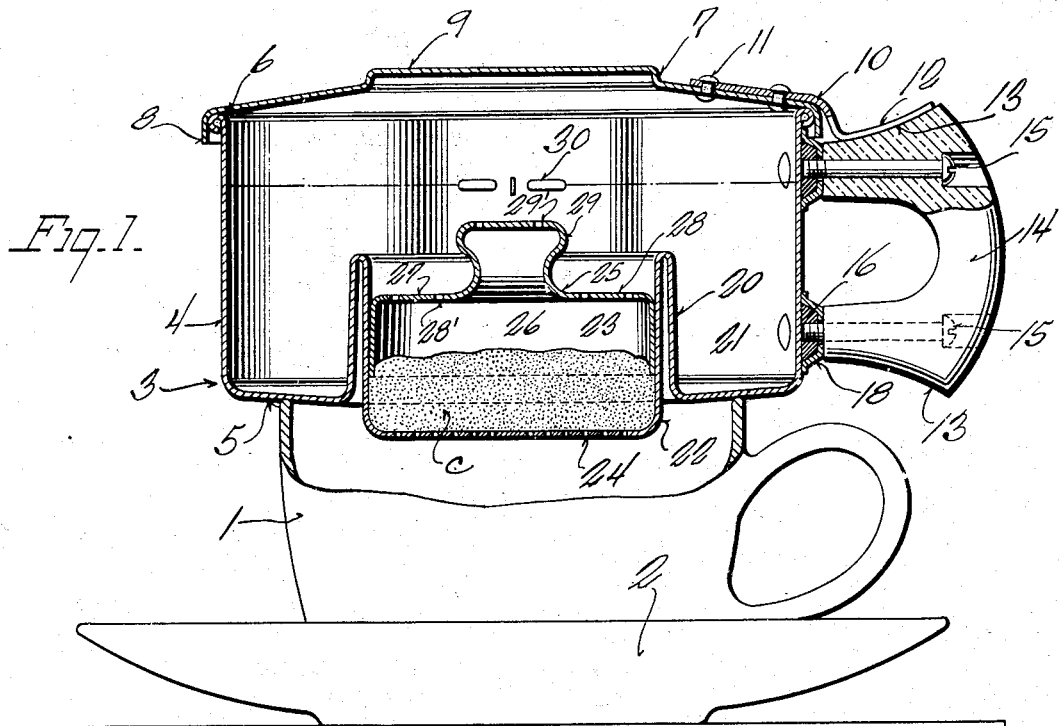
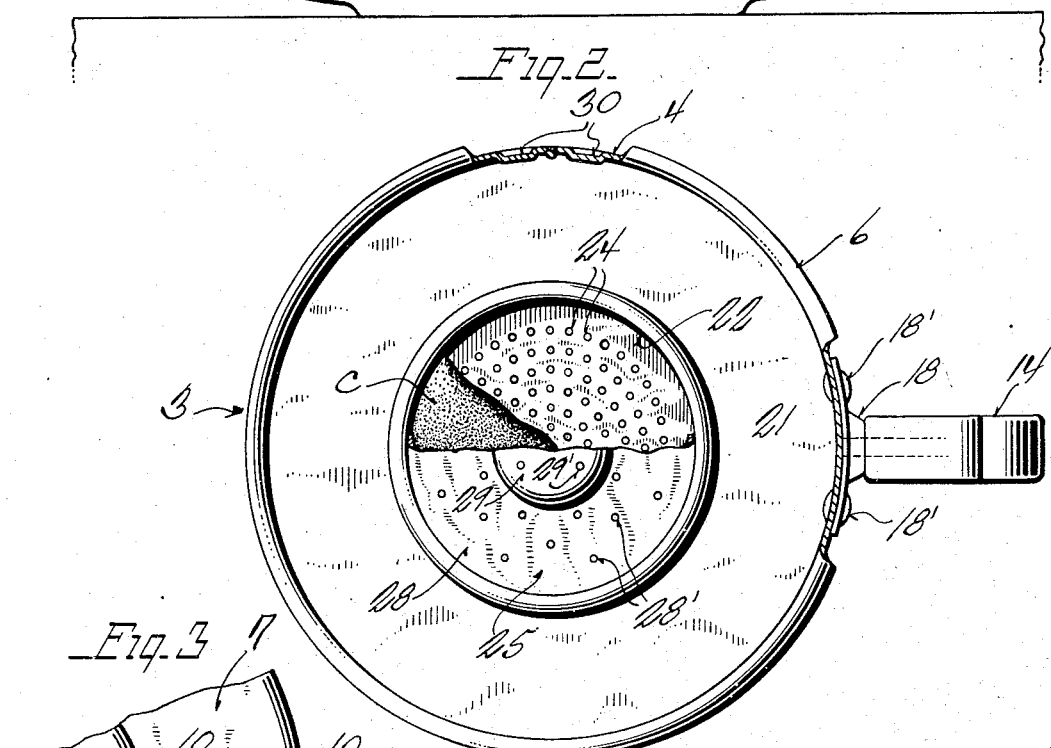
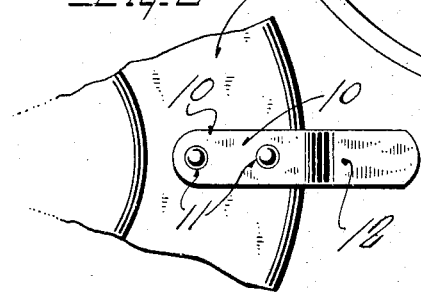
INVENTOR.
Robert H. Wentorf
BY
Bottum, Hudnall, Lecher,
McNamara and Michael
ATTORNEYS

Patented May 7, 1935

2,000,309

UNITED STATES PATENT OFFICE 2,000,309

ONE CUP COFFEE MAKER

Robert H. Wentorf, West Bend, Wis., assignor to West Bend Aluminum Company, West Bend, Wis., a corporation of Wisconsin Application March 1, 1933, Serial No. 659,150

6 Claims. (Cl. 53—3)

This invention relates in general to coffee makers or percolators and is especially designed and adapted for making a single serving of coffee, for example, one cup, although the device is also capable of convenient use in making a second serving or cup of coffee.

One object of the invention is to provide a coffee maker of this character which may be placed directly on the cup so that the coffee as made drips or percolates directly into the cup.

Another object of the invention is to provide a coffee maker of this character which embodies in its structure a well or trap for hot water to keep the beverage and the cup piping hot.

A further object is to provide a coffee maker having these advantages and capacities and which is simple and durable in construction, convenient and efficient in operation, attractive in appearance and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view partly in diametrical vertical section and partly in side elevation showing a coffee maker embodying the present invention in position on a drinking cup;

Figure 2 is a plan view of the coffee maker shown in Figure 1, the cover being removed and parts being shown in section and parts broken away for the sake of illustration; and Figure 3 is a fragmentary plan view illustrating the finger piece or handle of the cover.

Referring to the drawing, the numeral 1 designates a conventional drinking cup resting in a saucer 2. On the drinking cup the coffee maker embodying the present invention and designated generally at 3 is illustrated.

The coffee maker 3 consists of a shell-like container made up of a short cylindrical body portion 4 having an integral bottom 5. The upper end of the body portion 4 is open and is rimmed or beaded as at 6. A removable cover 7 is provided for the open upper end of the body portion 4 and has a downturned peripheral flange 8 which, when the cover is in position, overlaps the rim or bead 6 so that the cover plate provides an effective closure for the open end of the body portion 4. Centrally, the cover plate 7 is dished or cupped as at 9 for a purpose which will hereinafter more clearly appear. A finger piece or handle 10 is riveted as at 11 to the cover plate and has an offset portion 12 projecting therebeyond. This offset portion 12 conforms in contour to the curved upper and lower faces 13 of a handle 14 which is secured by screws 15 to nuts 16 contained in sockets 18 riveted as at 18' to the body portion 4 of the coffee maker. The handle 14 extends radially outward from the body portion 4 and facilitates handling of the coffee maker.

A portion of the bottom is pressed upwardly to form an annular or cylindrical and substantially vertical partition 20 which extends from the bottom to a point about half way to the top of the container and which is spaced from the body portion 4 to define a well or trap 21 for hot water. Integral with the annular partition and downwardly pressed or drawn from the material of the bottom is a cup-like structure 22 which defines a coffee receiving chamber 23. The side wall of this cup-like structure 22 is imperforate but the bottom thereof is provided with a multiplicity of small or fine apertures 24. It will be noted that the lower end of the cup-like structure 22 extends but slightly below the mean plane of the bottom 5 of the container and thus does not interfere with the filling of the cup 1 to the desirable extent. The bottom 5 slopes inwardly and downwardly and hence tends to facilitate centering of the coffee maker on the cup 1. The projection of the lower end of the structure 22 slightly below the bottom 5 tends to prevent the accidental displacement of the coffee maker 3 off of the cup 1. This arrangement also lends itself to compactness in a structure of the desired capacity.

A separator designated generally at 25 is provided and is in the form of an inverted cup having an imperforate body 26 and a stepped top 27. The lower step 28 of the top is provided with apertures 28' and the upper step 29 thereof has similar apertures 29'. By having the apertures 28' and 29' at different levels, flow of the water through the coffee is assured, as will be understood.

In use, the separator 25 is removed and an appropriate amount of coffee designated at C is deposited in the coffee chamber 23. The separator is then put in place and actively boiling water is poured into the interior of the container 3 until it reaches a level noted by the indentations 30 and by the numeral 1 between these indentations. Sufficient water to make a cup of coffee flows through the apertures 28' and 29' of the separator, percolates through the coffee and drips through the apertures 24 into the cup, the remainder of the hot water being retained in the well or trap 21 to insure a piping hot beverage.

After the coffee has been made the cover 7 is removed and deposited in an inverted position on the table so that it provides a rest or drip stand for the coffee maker which is set into the inverted cover, the projecting lower end of the coffee receiving chamber being received in the recess 9.

While I have shown and described one construction as a typical embodiment of the invention, it is to be understood that this construction has been selected merely for the purposes of illustration and that various changes in the size, shape and arrangement of the parts may be made without departing from the spirit of the invention or the scope of the subjoined claims.

The invention claimed is:

1. A coffee percolator comprising a container having a body portion and a bottom, means coacting with the bottom to define a coffee receiving chamber and also coacting with the body portion to define a chamber for preventing a portion of the liquid introduced into said container from entering said coffee receiving chamber, said bottom being perforated within the confines of said coffee receiving chamber, and a perforated separator between the upper part of the coffee receiving chamber and the interior of the container.

2. A coffee percolator comprising a cup-shaped shell having a body portion and a bottom, a portion of the bottom adjacent its periphery being adapted to rest directly on a drinking cup, the center portion of said bottom being perforated and having an integral cylindrical extension extending up from said central portion into the interior of the shell but terminating below the upper end thereof and coacting with the perforated portion of the bottom to define a coffee receiving chamber and with the body portion to define a well or trap for hot water.

3. A coffee percolator comprising a shell adapted to be supported on a drinking cup and having its bottom wall perforated and means within the shell providing an internal imperforate annular partition and coacting with the perforated bottom wall to define a coffee receiving chamber and with the body to provide a well or trap for hot water.

4. A percolator comprising a shell-like container made up of a body portion and an integral bottom, said bottom having an internal annular partition and a cup-like structure pressed therefrom with the cup-like structure within and connected to the partition, said partition coacting with the body portion to define a liquid retaining chamber disposed below the upper end of said partition, said cup-like structure having its lower end perforated and providing a receiving chamber for the beverage material.

5. A device of the character described comprising a shell-like container adapted to be supported on a drinking cup, the bottom of the container having a partition forming member integral therewith and extending up within and into the container to provide a beverage material receiving chamber, the upper end of which chamber is disposed above the bottom of said container and communicates with the interior of the container, there being a perforated wall at the lower end of the container through which coffee may discharge into the drinking cup.

6. A device of the character described comprising a shell-like container adapted to be supported on a drinking cup, the bottom of the container having a partition forming member integral therewith and extending up into the container to provide a beverage material receiving chamber, the upper end of which chamber communicates with the interior of the container, there being a perforated wall at the lower end of the container through which coffee may discharge into the drinking cup, said partition-like member terminating intermediate the ends of the container and defining a trap for liquid around the outside of said chamber.

ROBERT H. WENTORF.